May 3, 1927.

T. W. W. FORREST 1,626,805

APPARATUS FOR PROCESSING BERRIES ESPECIALLY THOMPSON SEEDLESS RAISINS

Filed July 13, 1926

INVENTOR
Thomas W. W. Forrest
BY Miller & Boyken
ATTORNEY

Patented May 3, 1927.

1,626,805

UNITED STATES PATENT OFFICE.

THOMAS W. W. FORREST, OF FRESNO, CALIFORNIA, ASSIGNOR TO SUN-MAID RAISIN GROWERS OF CALIFORNIA, OF FRESNO, CALIFORNIA.

APPARATUS FOR PROCESSING BERRIES ESPECIALLY THOMPSON SEEDLESS RAISINS.

Application filed July 13, 1926. Serial No. 122,082.

This invention relates to apparatus for processing berries, especially Thompson seedless raisins and it has for its objects the provision of means for carrying out the special processing of dried berries disclosed in my copending application filed simultaneously herewith under Serial Number 122,080 tho it is also of use in the treatment of other fruits.

Figure 1:
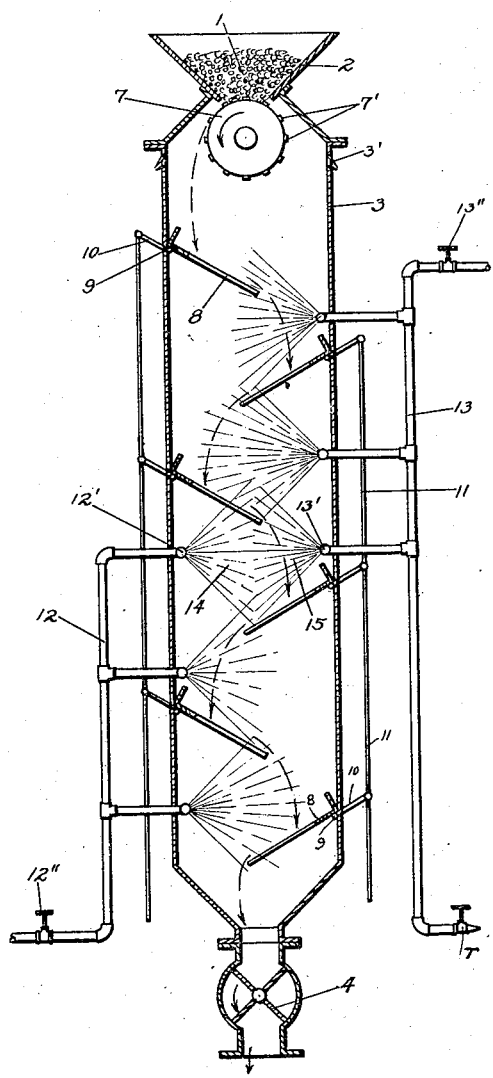
Figure 2:
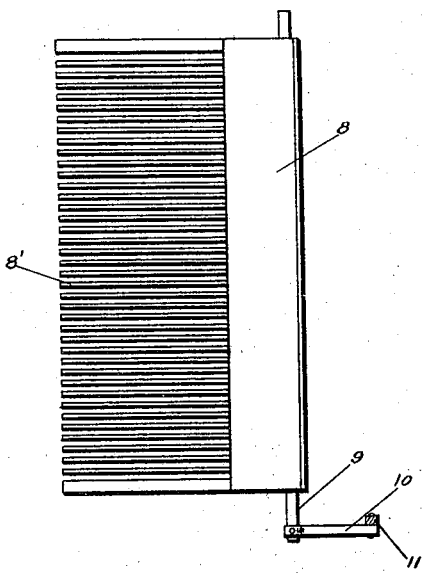
Figure 3:
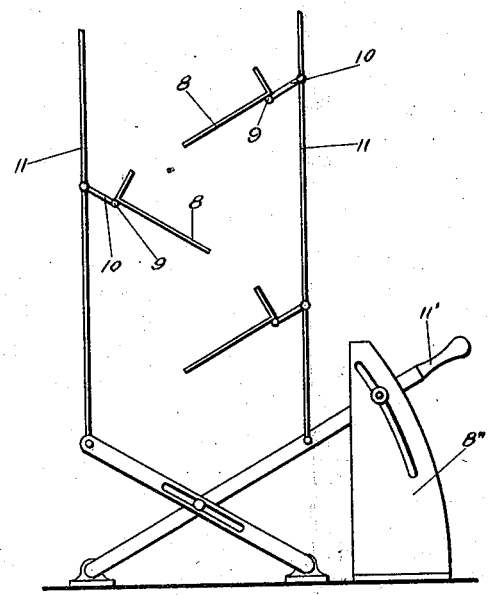

In the drawings hereto Figure 1 is a sectional elevation of the apparatus, Figure 2 is an enlarged plan view of one of the shelves and Figure 3 is a detached view in elevation showing the lever hook-up for simultaneously adjusting the angularity of all of the shelves.

In further detail 1 represents the dried fruit berries being discharged from a hopper 2 to the upper end of a casing 3 for final discharge from a rotary sealing gate 4 at the lower end of the casing.

The fruit is delivered from the hopper 2 for falling therethrough in a ribbon like stream through means of a drum 7 rotated under controlled speed by suitable means not shown, said drum lying adjacent the lower end of the chute 2 and preferably being provided with small ribs, nail heads or other projections as at 7' to carry the berries from under the load in the hopper.

Within the casing are staggered angularly disposed shelves 8 projecting alternately from opposite sides downwardly toward the central portion of the casing so as to cause the stream of berries to be diverted from one shelf to the other as indicated by the dotted path of the falling material.

These shelves are preferably made of wire pins as shown at 8' in Figure 2, the pins being spaced near enough to prevent the berries going through, and the shelves are each mounted on a shaft 9 or its equivalent supported on the casing and provided with an arm 10 all pivotally connected together by a system of leverage 11 for simultaneous movement of all the shelves for adjusting their angles.

Figure 3 shows the lower end of the lever connections and indicates an extension 11' of one lever for operating by hand in adjusting the shelves and for locking in adjusted position against the quadrant or equivalent 8''.

Extending vertically at opposite sides of the casing are pipes 12 and 13 provided each with perforated portions 12' and 13' directed oppositely toward the center so that blasts of gas from opposite pipes will mix in the path of the falling fruit as indicated at 14 and 15.

The pipes are each equipped with control valves 12'' and 13'' so that the blasts may be regulated.

The pipe 13 being for steam is arranged with ejection orifices at points above the highest orifices of pipe 12 so as to first act on the berries and preferably has its control valve 13'' on the lead in to the top, also is provided with a trap or bleeder valve T as indicated.

The pipe 12 being for ozone or other active gaseous agent preferably has additional ejection orifices at points below the lowest steam ejection as indicated.

At the upper end of the casing 3 are small relief spouts or openings as at 3' to permit the escape of any gases, vapor or moisture not absorbed by the fruit or other food being treated.

At the bottom of the casing is a discharge gate preferably of the revolving type as shown at 4 so that the product may be discharged without admitting the extraneous air, while the same office is performed at the upper end of the casing by the fruit closing the slight space between the chute 2 and drum 7, tho the liberated vapor and gas within the casing will of itself operate to exclude the outer air to a great extent.

The gate of whatever type used is operated by any suitable drive mechanism well understood and therefore not shown.

In operation of the apparatus the fruit following the line of fall indicated is subjected to opposing blasts of active or inactive gases or vapors from the pipes 12 and 13 as may be desired.

I claim:

1. Apparatus of the character described comprising a casing, means for delivering a controlled stream of berries to the upper end thereof for falling therethrough, means within the casing interrupting the fall of said berries, and confronting nozzles arranged and adapted for ejecting opposing blasts of gas and vapor at the berries whilst falling.

2. In a structure as specified in claim 1, additional nozzles for ejecting the vapor only arranged at one end of the casing, and additional nozzles for ejecting the gas only arranged at the other end of the casing.

3. Apparatus of the character described comprising a vertically disposed casing, means for delivering a controlled stream of berries to the upper end thereof for falling therethrough, a plurality of steam injecting nozzles directed into the casing one above the other along the upper portion thereof, and a plurality of gas injecting nozzles directed into the casing one above the other along the lower portion thereof, one of the gas nozzles and one of the steam nozzles being arranged in opposed relation whereby their blasts will substantially meet upon the stream of falling berries.

THOMAS W. W. FORREST.